United States Patent [19]

Yamaguchi

[11] Patent Number: 5,303,111
[45] Date of Patent: Apr. 12, 1994

[54] SUPERCONDUCTING COIL PROTECTIVE SYSTEM

[75] Inventor: Satarou Yamaguchi, Tokyo, Japan

[73] Assignee: Mitsubishi Denki Kabushiki Kaisha, Tokyo, Japan

[21] Appl. No.: 872,068

[22] Filed: Apr. 22, 1992

[30] Foreign Application Priority Data

Apr. 23, 1991 [JP] Japan ................................. 3-091894

[51] Int. Cl.$^5$ ........................ H02H 9/00; H02H 3/00
[52] U.S. Cl. ............................................ 361/19; 361/2
[58] Field of Search ..................... 361/19, 2, 4, 3, 5, 361/10, 11, 58

[56] References Cited

U.S. PATENT DOCUMENTS 4,740,858  4/1988  Yamaguchi et al. .................... 361/4
5,210,674  5/1993  Yamaguchi et al. ................... 361/19

FOREIGN PATENT DOCUMENTS 0690583  10/1979  U.S.S.R. .............................. 361/19

OTHER PUBLICATIONS

"Improvements in the Parallel Resistor Circuit for the Quench Protection of a Superconducting Magnet", Tomoaki Nakano (Dept. of Eng., Faculty of Eng., Nagoya Univ.) Dec. 1982, pp. 73–79.

*Primary Examiner*—A. D. Pellinen
*Assistant Examiner*—Ronald W. Leja
*Attorney, Agent, or Firm*—Leydig, Voit & Mayer

[57] ABSTRACT

A superconducting coil protective system comprising a protective resistor connected in parallel to a superconducting coil for dissipating the energy stored on the superconducting coil and a normally-closed power switch for interrupting an electric current flowing from the power source to the superconducting coil in response to a quenching signal from the quenching detector. A fuse circuit, which includes a serially-connected fuse and a closure switch, is connected in parallel to the power switch. The protective system may comprise a current interrupting circuit connected in parallel to the superconducting coil and the protective resistor and a commutation switch connected in series with the protective resistor and the current interrupting circuit for allowing a commutation of a current from the superconducting coil to the current interrupting circuit in response to the quenching signal. In this case, the fuse circuit is connected in parallel to the protective resistor.

10 Claims, 5 Drawing Sheets

SUPERCONDUCTING COIL PROTECTIVE SYSTEM

BACKGROUND OF THE INVENTION

This invention relates to a superconducting coil protective system for protecting a superconducting coil from being destroyed upon quenching.

FIGS. 6 to 9 illustrate circuit diagrams of various superconducting coil protective systems disclosed in "Improvements in the Parallel Resistor Circuit for the Quench Protection of a Superconducting Magnet" by T. Nakano, S. Okuma and Y. Amamiya, B-102 No. 12 pp. 73–79, published from Japanese Institute of Electrical Engineering, December, 1982.

In the conventional parallel resistor circuit type protective system illustrated in FIG. 6, a cryostat CR comprises a superconducting coil L and a resistance R(t) of a normal conduction portion generated in the superconducting coil L. This resistance R(t) has a resistance that increases as the time lapses. Across the cryostat CR, a power source such as a mono-polar electric source E is connected through a power switch S, and a protective resistor $R_o$ is connected in parallel to the cryostat CR.

FIG. 7 illustrates a protective circuit in which a diode D is employed in place of the protective resistor $R_o$ and two switches S1 and S2 as well as three resistors R1, R2 and R3 are used to form a multi-stage parallel resistors.

FIG. 8 illustrates a protective circuit in which series-connected resistors Ra and Rb are connected in parallel to the cryostat CR, and a capacitor C is connected across the resistor Rb. A protective circuit illustrated in FIG. 9 further comprises a series circuit of an inductor Ls and a resistor Rs connected in parallel to the protective resistor.

All of these known protective circuits illustrated in FIGS. 6 to 9, which comprise the power switch S connected between the power source E and the superconducting coil L, have the basically same disadvantages, so that the description of the d.c. current interrupting operation will be made only in terms of the protective circuit illustrated in FIG. 6 for simplicity.

During normal operation, the power switch S of the protective circuit of FIG. 6 is closed and a very large current from the power source E flows through the superconducting coil L but substantially no current flows through the protective resistor $R_D$ because it has a large resistance.

However, upon the occurrence of quenching in the superconducting coil L, in order to quickly remove stored energy within the superconducting coil L, as soon as the occurrence of the quenching in the superconducting coil L is detected, the voltage of the power source E is decreased and at the same time the power switch S is opened. Then a high voltage Vc which generates across the power switch S is applied to the protective resistor $R_D$, whereupon an electric current which has been flowing through the superconducting coil L initiates to flow as indicated by an arrow $i_D$. Then, the magnetic energy stored in the superconducting coil L is converted into heat at the protective resistor $R_o$ to be dissipated to the exterior of the cryostat CR, whereby the superconducting coil L can be protected.

With the conventional protective system as above discussed, the power switch S must carry an extremely massive current, which also flows through the superconducting coil L, during normal operating condition, and also the power switch S must interrupt this massive current at a high voltage upon the occurrence of the quenching in the superconducting coil L. However, it sometimes happens that the power switch S fails to interrupt the current when the arc voltage of the arc plasma generated across the contacts of the power switch S is low and does not reach the interrupting voltage. If the current interruption is failed, the power switch S and the superconducting coil L are destroyed.

In the circuit illustrated in FIG. 6, since the current must be interrupted by the power switch S, the power switch S must have a d.c. current interruption capability which can break a current ic at a voltage (RD×ic). Also, because of an arc plasma generated between the switch contacts of the power switch S, the current interruption sometimes fails and it is difficult to reliably carry out the interruption.

FIG. 10 illustrates a further example of a conventional superconducting coil protective system in which a reversible polarity power source PS is connected across the superconducting coil L through a disconnector DS. The system also includes a protective resistor RD connected in parallel to the superconducting coil L. A closing switch S3 is connected in series to the protective resistor RD and a fuse F is connected in parallel to the the resistor RD. The normal conduction portion of the superconducting coil L is not illustrated in FIG. 10.

During normal operation, the disconnector DS is closed so that a predetermined current i can flow into the superconducting coil l in the direction of the arrow from the reversible polarity power source PS to energize the superconducting coil L.

Upon the occurrence of quenching in the superconducting coil L, the quenching is detected and the closing switch S3 is immediately closed and the voltage across the reversible polarity power source is reversed or made zero. Then, the current from the power source PS rapidly decreases and the current in the superconducting coil L is commutated into the fuse F as illustrated by the arrow ic, so that the current from the power source PS eventually reduces to zero, upon which the disconnector DS can be opened. Thereafter, the fuse F melts because of the commutated current. Therefore, the commutated current which has been flowing through the fuse is interrupted and again commutated to the protective resistor RD where the energy in the superconducting coil L is dissipated.

In this arrangement, it is not possible to control the relationship between the time points of the closure of the closing switch S3 and the current commutation into the fuse F, so that the arrangement is disadvantageous in that a large-sized fuse must be used as the fuse F because the current interruption fails if the fuse F melts before the current commutation completes, and that it is difficult to simultaneously interrupt the current in the system having a plurality of d.c. interrupting units.

SUMMARY OF THE INVENTION

Accordingly, one object of the present invention is to provide a superconducting coil protective system free from the above discussed problems of the conventional design.

Another object of the present invention is to provide a superconducting coil protective system which is reliable in operation.

Another object of the present invention is to provide a superconducting coil protective system which is simple and inexpensive.

A further object of the present invention is to provide a superconducting coil protective method which can effectively and efficiently protect the superconducting coil.

With the above objects in view, according to the present invention, the superconducting coil protective system for protecting a superconducting coil connected in parallel to a power source comprises a quenching detector for detecting occurrence of a quenching in the superconducting coil and generating a quenching signal indicative of the occurrence of a quenching. The system also comprises a power switch which closes in response to the quenching signal and a protective resistor for dissipating the energy stored in the superconducting coil. The power switch is in series with the superconducting coil and the protective load is in parallel to the superconducting coil. A series circuit including a fuse and a closure switch is connected in parallel to the power switch so that the current through the power switch can commutate to the series circuit of the fuse and the closure switch when the power switch is opened.

According to another aspect of the present invention, a normally-open first switch is connected in series with the protective resistor instead of the power switch and the series circuit including a fuse and a closure switch is connected in parallel to the protective resistor.

BRIEF DESCRIPTION OF THE DRAWINGS

The present invention will become more readily apparent from the following detailed description of the preferred embodiments of the present invention takes in conjunction with the accompanying drawings, in which.

DESCRIPTION OF THE PREFERRED EMBODIMENTS

Figure 1:
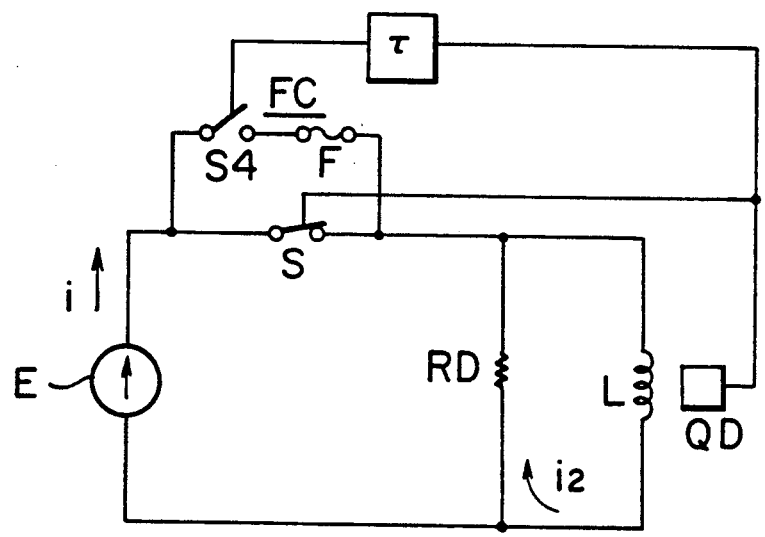
FIG. 1 is a circuit diagram illustrating one embodiment of the superconducting coil protective system of the present invention.

FIG. 1 illustrates a superconducting coil protective system of the present invention for protecting a superconducting coil L connected in parallel to a power source E. The superconducting coil protective system comprises a protective resistor RD adapted to be connected in parallel to the superconducting coil L for dissipating the energy stored in the superconducting coil L.

The protective system also comprises a quenching detector QD which may be any known quenching detector such as the bridge-type detector of detecting occurrence of a quenching in the superconducting coil L and generating a quenching signal indicative of the occurrence of a quenching in the superconducting coil L. The quenching detector QD is connected to a normally-closed power switch S serially connected between the power source E and the parallel-circuit of the superconducting coil L and the protective resistor RD. The power switch S interrupts an electric current flowing from the power source E to the superconducting coil L in response to the quenching signal from the quenching detector QD.

According to the present invention, a fuse circuit FC which includes a fuse F and a closure switch S4 serially connected to each other is connected in parallel to the power switch S. The closure switch S4 is also connected to the quenching detector QD through a delaying circuit $\tau$.

During normal operation of the superconducting coil apparatus, no quenching phenomenon is present in the superconducting coil L and no quenching signal is provided from the quenching detector QD. Therefore, the power switch S is kept closed and the closure switch S4 in the fuse circuit FC is kept opened, so that a predetermined current i is supplied from the power source E to the superconducting coil L. Substantially no current flows through the protective resistor RD since it has a high resistance.

When a quenching is detected by the quenching detector QD, a quenching signal causes the power switch S to open to interrupt the current i flowing therethrough. This causes the current i to commutate to the protective resistor RD as a commutated current i2, whereby the energy in the superconducting coil L can be dissipated by the protective resistor RD. The protective resistor RD has a resistance large enough to covert the energy of the commutated current which corresponds to the electromagnetic energy stored on the superconducting coil L into heat which can be dissipated from the protective resistor RD.

In order to eliminate the fear that the power switch S fails to interrupt the current when the arc voltage of the arc plasma generated across the contacts of the power switch S is low and does not reach the interrupting voltage, the quenching signal is also applied to the closure switch S4 through a delay circuit $\tau$ to close the closure switch S4. Then, the current flowing through the power switch S commutates to the fuse circuit FC due to its arc voltage Va. The commutation time T1 at this time is given by $$T1 \approx Lx/(Va/I - Ry) \tag{1}$$

where Lx ia a stray inductance of the fuse circuit FC and the power switch S, I is the current to be commutated and Ry is resistance of the fuse circuit FC.

The fuse F is selected so that it does not melt when a current I flows therethrough for a time T1 and that it melts when the same current flows for a time several times longer than the time T1. Thus the fuse melts only after the arc plasma between the contacts of the power switch S has completely been disappeared and the insulation between the contacts has sufficiently been recovered. Therefore, the fuse circuit FC backs up the power switch S which functions as a current interrupter.

Figure 2:
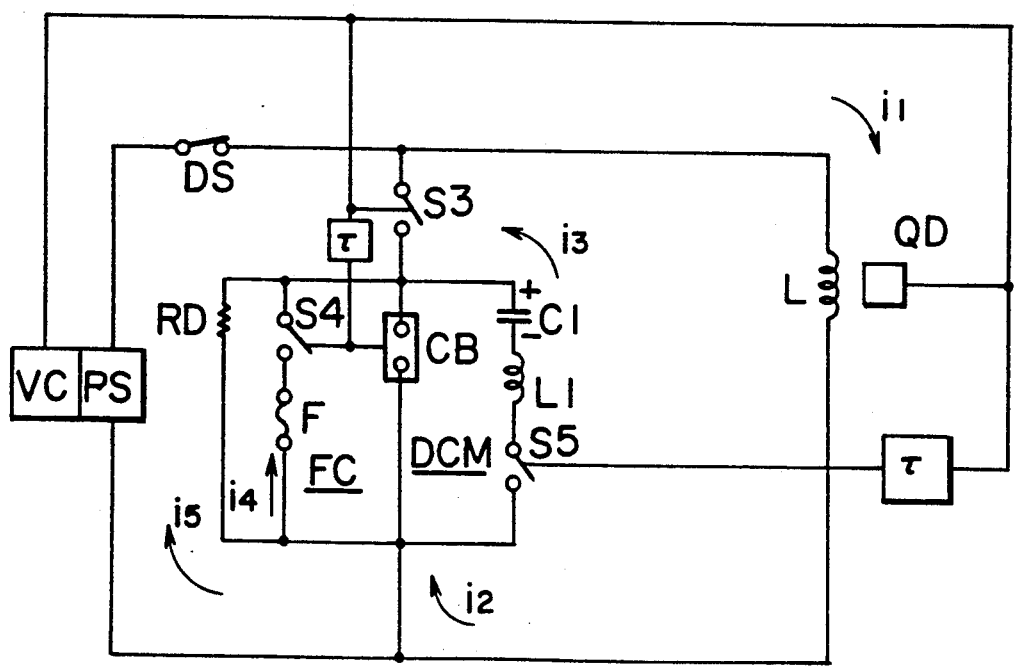
FIG. 2 is a circuit diagram illustrating another embodiment of the superconducting coil protective system of the present invention.

FIG. 2 illustrates another embodiment of the superconducting coil protective system of the present invention in which the quenching detector QD is connected to a voltage controller VC associated with the power source PS so that the signal generated from the quenching detector QD is supplied to the voltage controller VC for changing polarity of an output voltage from the power source PS in response to the quenching signal. The voltage controller VC may be any known controller such as a thyristor or a GTO thyristor as long as the voltage controller VC can change the polarity of the output voltage to reduce the voltage to a first voltage at which a first commutation which will be explained in detail later takes place.

The protection system also comprises a current interrupter DCM connected in parallel to the superconducting coil L through a series connected first switch S3 which is usually open but closed in response to the quenching signal supplied from the quenching detector QD. The current interrupter DCM allows a first commutation in which a current from the superconducting coil L is commutated to the current interrupter DCM when the first switch S3 is closed and when the output voltage from the power source PS is reduced by the voltage controller VC to reduce it to the first voltage at which the first commutation occurs and which is determined by the relationship between the impedance of the power source PS and the impedance of the series circuit composed of the current interrupter DCM and the first switch S3.

The current interrupter DCM comprises a first series circuit including a circuit breaker CB and a series circuit including a capacitor C1, and inductance L1 and a second switch S5 and connected in parallel to the circuit breaker CB. The second switch S5 is normally open and is arranged to close upon the occurrence of the quenching in the superconducting coil L through a delay circuit $\tau$ with a predetermined time lag corresponding to a very short period of time necessary for completing the fist commutation of the current. When the the second switch S5 is closed, the electric charge on the capacitor C1 can now flow through the switch S5 and the inductor L1 into the circuit breaker CB where it is cancelled out with the first-commutated current $i_2$, so that the circuit breaker CB is now opened and the current is interrupted. Connected in parallel to the current interrupter DCM is a fuse circuit FC similar to that employed in the circuit illustrated in FIG. 1. The fuse circuit FC allows the current commutated to the current interrupter DCM to further commutate (second commutation) thereto when the current interrupter DCM is opened. Connected further in parallel to the fuse circuit FC is a protective resistor RD for allowing a third commutation in which the second-commutated current is commutated to the protective resistor RD upon the melting of the fuse F of the fuse circuit FC.

The protective resistor RD has a resistance large enough to covert the energy of the third-commutated current which corresponds to the electromagnetic energy stored on the superconducting coil L into heat which can be dissipated from the protective resistor RD. A disconnector DS is connected between the power source PS and the parallel-connected commutation switch S3 and the superconducting coil L.

During normal operation of the superconducting coil apparatus, no quenching phenomenon is present in the superconducting coil L and no quenching signal is provided from the quenching detector QD. Therefore, the first switch S3 is opened and the voltage controller VC allows a predetermined current $i_1$ to be supplied from the power source PS to the superconducting coil L. The circuit breaker CB in the current interrupter DCM is closed and the second switch S5 is opened so that an electrical charge on the previously charged capacitor bank C1 is maintained. The disconnector DS is closed and the commutation switch S4 is opened.

When a quenching is detected by the quenching detector QD, a quenching signal is generated. The quenching signal causes the voltage controller VC associated with the power source PS to operate to decrease the output voltage from the power source PS and causes the first switch S3 to close. The decrease of the output voltage from the power source PS is continued until the polarity of the output voltage is reversed. This can be done by means of GTO thyristor. As the current $i_1$ flowing through the superconducting coil L begins to decrease slightly, the current from the power source PS decreases rapidly and a current $i_2$ flowing through the current interrupter DCM increases rapidly. When the output voltage from the power source PS decreases to a first voltage at which the current flowing through the power source PS becomes zero and all the current $i_2$ from the superconducting coil L flows through the current interrupter DCM, the power source PS is electrically isolated from the superconducting coil L and the current commutation completes. The disconnector DC can now be opened. This current commutation as above described is referred to as a first commutation.

Then, the second switch S5 is closed in response to the quenching signal from the quenching detector QD but with a certain time lag $\tau_I$ which corresponds to a period of time necessary for the first commutation to complete after the occurrence of the quenching in the superconducting coil L. Then, the electrical charge on the capacitor bank C1 discharges as a current indicated by an arrow $i_3$ through the circuit breaker CB. Since the commutated current $i_2$ and the current $i_3$ are opposite in the direction relative to the circuit breaker CB, and since the capacitor bank C1 is selected to have an amount of discharge current sufficient to reduce the current $i_2$ to zero, the current flowing through the circuit breaker CB is reduced to zero.

Therefore, the circuit breaker CB can now be opened in response to the quenching signal with a suitable time lag $\tau$ without generating an electric arc across the separating contact and the current flowing through the current interrupter DCM is interrupted. The, the current $i_2$ flowing through the current interrupter DCM is commutated as a second-commutated current $i_4$ flowing through the fuse circuit FC when the closure switch S4 of the fuse circuit FC is closed by the quenching signal. The second-commutated current $i_4$ eventually causes the fuse F to melt, whereupon the current $i_4$ is again commutated to the protective resistor RD connected in parallel to the fuse circuit FC as indicated by $i_5$, whereby the energy of this current $i_5$ is dissipated as heat generated at the protective resistor RD.

If some trouble occurs in the circuit of the capacitor C1, the inductor L1 and the switch S5 or in the control system of the circuit and the current flowing through the circuit breaker CB cannot be reduced to zero, the normal interruption of the second-commutated current cannot be achieved. Even in this case, the circuit breaker CB is opened and at the same time the switch S4 is closed as in the previously-described operation, so that the second-commutated current $i_2$ through the circuit breaker CB is commutated again to the the fuse circuit FC due to the arc voltage at the circuit breaker CB.

Figure 3:
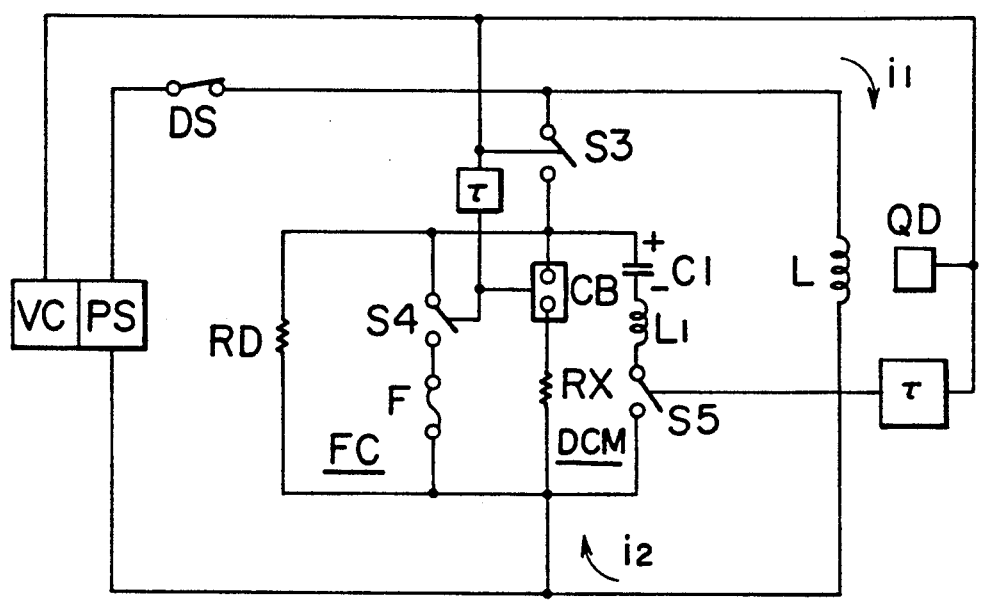
FIG. 3 is a circuit diagram illustrating another embodiment of the superconducting coil protective system of the present invention.

FIG. 3 illustrates another embodiment of the superconducting coil protective system in which the d.c. current interrupter DCM comprises a commutation resistor RX connected in series to the circuit breaker CB. This commutation resistor RX functions to enable the second current commutation from the current interrupter DCM into the fuse circuit FC to be achieved more smoothly. If the arc voltage of the circuit breaker CB is high enough, the resistor Rx is not necessary since the necessity of the resistor Rx depends on the characteristics of the arc plasma which is generated between the contracts of the circuit breaker CB. That is, when the commutation switch S4 is closed, the current commutates to the fuse circuit FC by an arc voltage Va across the contacts of the circuit breaker CB and a voltage (Rx·ic) generated by the commutation resistor Rx. At this time, the commutation time T2 is expressed by $$T2 \approx Lx/(Rx+Va/ic-Ry) \qquad (2)$$

where, Lx is a stay inductance of the fuse circuit FC, the circuit breaker CB and the commutation resistor Rx, Rx is a resistance value of the commutation resistor, and the other items are the same as those of equation (1).

Figure 4:
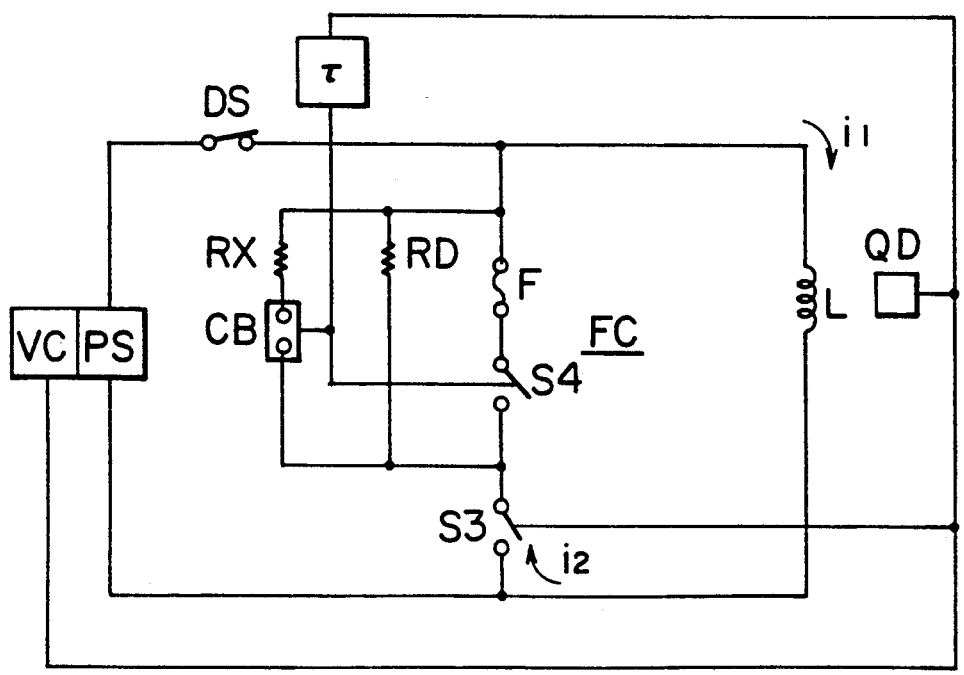
FIG. 4 is a circuit diagram illustrating a further embodiment of the superconducting coil protective system of the present invention.

FIG. 4 illustrates another embodiment of the superconducting coil protective system of the present invention, in which it is seen that the series circuit composed of capacitor C1, the inductor L1 and the switch S5 is eliminated from the circuit illustrated in FIG. 3.

During the normal operation, the disconnector DS and the circuit breaker CB are closed and the switches S3 and S4 are opened. When the quenching occurs, the commutation switch S3 is closed and the polarity of the voltage at the power source PS is reversed. Simultaneously with the reduction of the current flowing through the disconnector DS toward zero, the current commutates to the circuit including the first closure switch S3, the circuit breaker CB and the commutation resistor Rx. The disconnector DS is opened when the current flowing through the disconnector DS becomes zero. Then, the circuit breaker CB is opened and the closure switch S4 is closed, so that the current is commutated from the circuit breaker CB to the fuse circuit FC. The commutation time T2 is given by equation (2).

The fuse F is selected to have such characteristics that it does not melt within the commutation time T2, so that the fuse F melts only after the commutation to the fuse circuit FC has been completed and the insulation between the contacts of the circuit breaker DB has been recovered, whereupon the current commutates to the protective resistor RD.

If the closure switch S4 were not provided, the current commutation to the fuse F is initiated simultaneously with the closure of the closure switch S3. With the closure switch S4 as illustrated in FIGS. 3 and 4, the timing relationship between the operation of the closure switch S4 and the commutation switch S3 as well as the circuit breaker CB can be controlled. Therefore, a suitable relationship between these operation and the melting characteristics of the fuse F can suitably be obtained.

Figure 5:
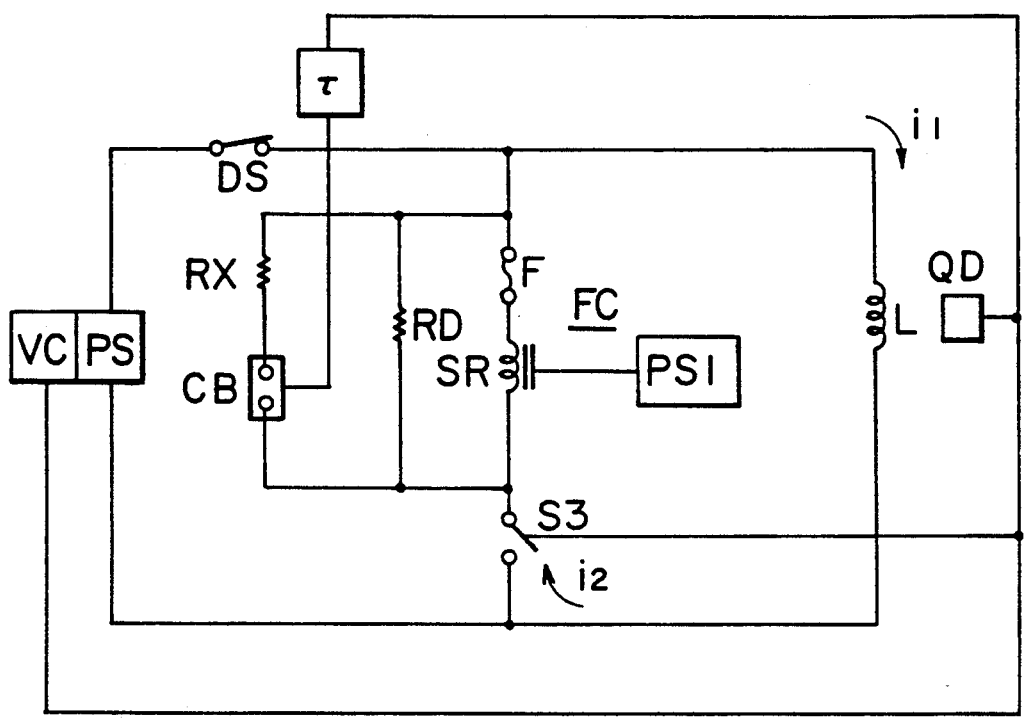
FIG. 5 is a circuit diagram illustrating another embodiment of the superconducting coil protective system of the present invention.
Figure 6:
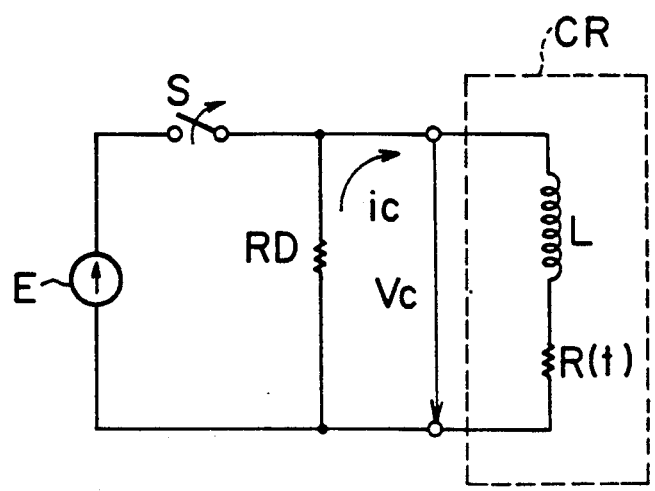
FIG. 6 is a circuit diagram illustrating one example of the conventional superconducting coil protective system.
Figure 7:
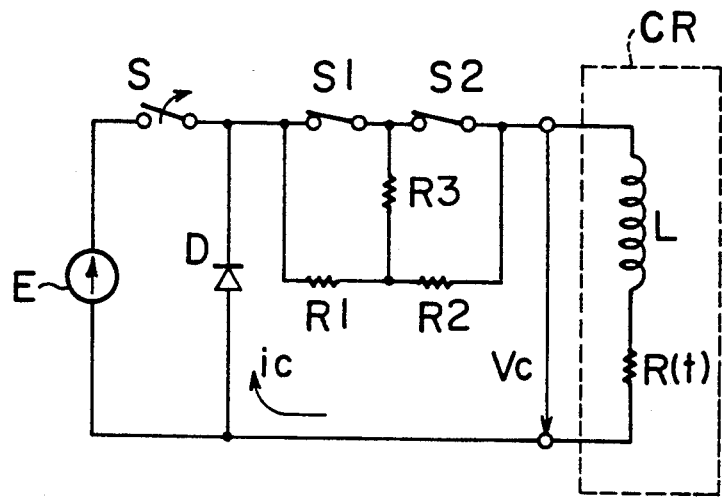
FIG. 7 is a circuit diagram illustrating another example of the conventional superconducting coil protective system.
Figure 8:
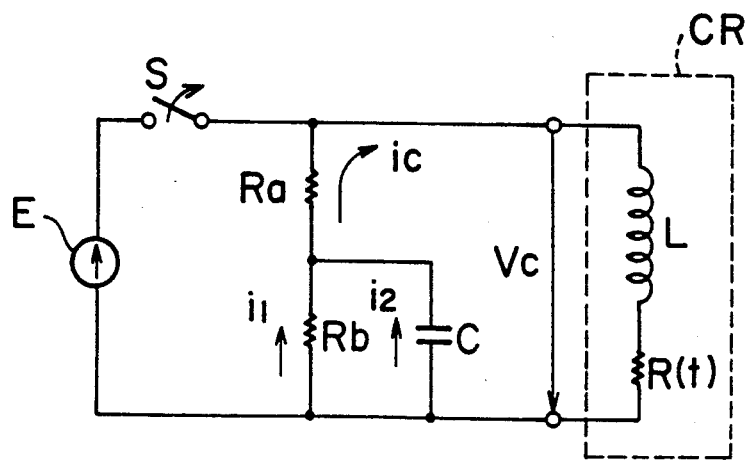
FIG. 8 is a circuit diagram illustrating a further example of the conventional superconducting coil protective system.
Figure 9:
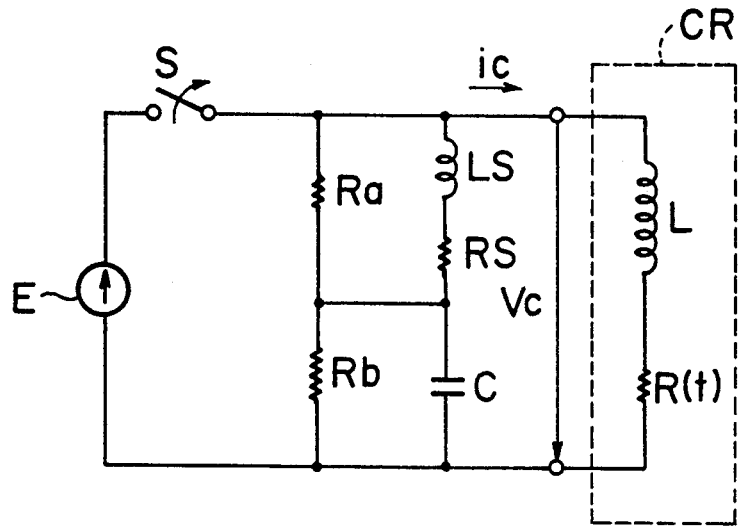
FIG. 9 is a circuit diagram illustrating another example of the conventional superconducting coil protective system.
Figure 10:
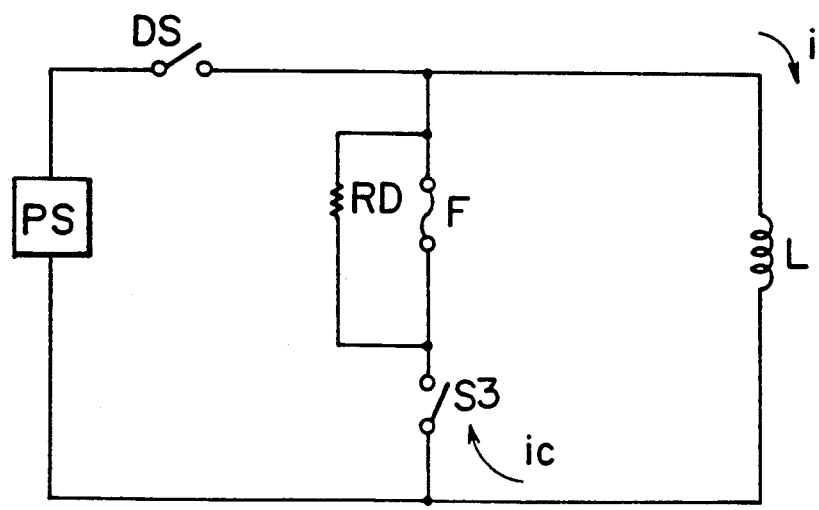
FIG. 10 is a circuit diagram illustrating a still another example of the conventional superconducting coil protective system.

FIG. 5 illustrates a further embodiment of the superconducting coil protective system of the present invention, in which a saturable reactor SR connected to a control power source PS1 is employed in place of the closure switch S4 in the circuit arrangement illustrated in FIG. 4. The time interval during which no current flows through the fuse F is expressed by $$T3 \approx \Delta W/(Va+ic \cdot Rx) \qquad (3)$$

Since $\Delta W$ can be controlled by the power source PS1, the time T3 with no current can be controlled, resulting in advantageous results similar to those of the embodiment previously discussed in conjunction with FIG. 4. Also, the surge voltages which are generated upon the current interruption by the fuse F is advantageously absorbed by the saturable reactor SR to protect the superconducting coil L.

As has been described, the superconducting coil protective system comprises a fuse circuit including a serially-connected fuse and a closure switch and connected in parallel to a power switch which is serially connected between the power source and the superconducting coil. Alternatively, the protective system comprises a current interrupting means connected in parallel to the superconducting coil and a protective resistor, and a commutation switch is connected in series with the protective resistor and the current interrupting means for allowing a commutation of a current from the superconducting coil to the current interrupting means in response to the quenching signal. In this case, the fuse circuit is connected in parallel to the protective resistor.

Therefore, according to the present invention, the fuse circuit functions to back up the power switch or enables to control the timing relationship between the operation of the switch and the fuse, whereby the current interruption can be reliably and easily achieved.

What is claimed is:

1. A superconducting coil protective system for protecting a superconducting coil connected in parallel to a power source generating an output voltage, said protective system comprising:

quenching detecting means for detecting occurrence of quenching in said superconducting coil and generating a quenching signal indicative of the occurrence of a quenching;

a protective resistor connected in parallel to said superconducting coil for dissipating the energy stored on the superconducting coil;

a normally-closed power switch for interrupting an electric current flowing from the power source to the superconducting coil in response to the quenching signal from said quenching detecting means; and a fuse circuit connected in parallel to said power switch and including a fuse and a closure switch connected to each other in series.

2. A superconducting coil protective system as claimed in claim 1, wherein the closure switch is connected to said quenching detecting means through a delaying means.

3. A superconducting coil protective system for protecting a superconducting coil connected in parallel to a power source generating an output voltage, said protective system comprising:

quenching detecting means for detecting occurrence of quenching in said superconducting coil and generating a quenching signal indicative of the occurrence of quenching;

a protective resistor connected in parallel to the superconducting coil for dissipating the energy stored on the superconducting coil;

a current interrupting means connected in parallel to the superconducting coil and said protective resistor;

a commutation switch connected in series with said protective resistor and said current interrupting means for allowing a commutation of a current from said superconducting coil to said current interrupting means in response to said quenching signal; and a fuse circuit connected in parallel to said protective resistor and including a fuse and a closure switch connected to each other in series.

4. A superconducting coil protective system as claimed in claim 3, further comprising voltage control means for reducing the output voltage from said power source in response to the quenching signal.

5. A superconducting coil protective system as claimed in claim 4, wherein said voltage control means is capable of reversing polarity of said output voltage from the power source.

6. A superconducting coil protective system as claimed in claim 3, further comprising a disconnector connected in series with the power source.

7. A superconducting coil protective system as claimed in claim 3, wherein said current interrupting means comprises a circuit breaker.

8. A superconducting coil protective system as claimed in claim 3, wherein said current interrupting means comprises a resistor connected in series with said circuit breaker.

9. A superconducting coil protective system as claimed in claim 7, further comprising a series circuit of a capacitor, an inductor and a normally-open switch, said series circuit being connected in parallel to said circuit breaker.

10. A superconducting coil protective system as claimed in claim 3, wherein said closure switch comprises a saturable reactor connected to a control power source.

* * * * *